UNITED STATES PATENT OFFICE.

ABNER J. McDANNEL, OF DENVER, COLORADO, ASSIGNOR, BY MESNE ASSIGNMENTS, OF ONE-HALF TO JOHN F. LOCKE, MYRON C. FLINT, AND EDWARD T. LE CLAIR, ALL OF SAME PLACE.

COMPOSITION OF MATTER.

SPECIFICATION forming part of Letters Patent No. 428,219, dated May 20, 1890.

Application filed June 18, 1889. Serial No. 314,732. (No specimens.)

*To all whom it may concern:*

Be it known that I, ABNER J. MCDANNEL, a citizen of the United States, residing at Denver, in the county of Arapahoe and State of Colorado, have invented a certain new and useful Composition of Matter to be Used in Making Manifold Manuscript Copies; and I do declare the following to be a full, clear, and exact description of the invention, such as will enable others skilled in the art to which it appertains to make and use the same.

My invention relates to a composition of matter for use in making manifold manuscript copies; and my composition consists of the following ingredients, combined in the proportions stated, viz: seven ounces of glycerine, three grains of oxalic acid, one fluid ounce of alcohol, four ounces of white glue, one grain of carbolic acid, four fluid ounces of water, and one ounce of gum-arabic. Put the oxalic acid with the alcohol and mix in the white glue, forming oxalic solution of white glue. Mix the carbolic acid and water together, and then add the gum-arabic, forming carbolic solution of gum-arabic. Mix the oxalic solution of white glue and the carbolic solution of gum-arabic at a heat of 210° Fahrenheit, after which remove the same from the fire and allow to cool to 95°. Then add the glycerine and let the composition stand for twelve hours, after which heat the composition to 150° Fahrenheit and pour in shallow pans of suitable size to cool. At the expiration of twelve hours wash the exposed surface of the composition with cold water. Then it is ready for use.

The composition within the shallow pans forms a white oily pad entirely different from anything heretofore used.

If the pad should become rough or injured in any way from exposure or abuse, it may be reheated and allowed to cool, after which it is as good as new.

Having thus described my invention, what I claim, and desire to secure by Letters Patent, is—

The herein-described composition of matter to be used in making manifold manuscript copies, consisting of glycerine, oxalic acid, alcohol, white glue, carbolic acid, water, and gum-arabic, in the proportions substantially as specified.

In testimony whereof I affix my signature in presence of two witnesses.

ABNER J. McDANNEL.

Witnesses:
  Z. F. WILBER,
  JAS. A. KILLON.